United States Patent [19]

Bodine

[11] Patent Number: 4,885,098
[45] Date of Patent: * Dec. 5, 1989

[54] SONIC METHOD FOR FACILITATING THE REMOVAL OF SOLID PARTICLES FROM A SLURRY

[76] Inventor: Albert G. Bodine, 7877 Woodley Ave., Van Nuys, Calif. 91406

[*] Notice: The portion of the term of this patent subsequent to Nov. 28, 2006 has been disclaimed.

[21] Appl. No.: 263,040

[22] Filed: Oct. 21, 1988

Related U.S. Application Data

[63] Continuation-in-part of Ser. No. 128,454, Dec. 3, 1987, Pat. No. 4,780,138, which is a continuation of Ser. No. 923,575, Oct. 27, 1986, abandoned.

[51] Int. Cl.[4] .................... B01D 21/00; B01D 21/01
[52] U.S. Cl. .................................. 210/702; 210/747;
210/748; 75/2; 75/101 R; 422/127; 422/269;
422/281; 423/1; 423/20; 423/27; 423/50;
423/34; 423/55; 423/65; 423/71; 423/85;
423/92; 423/101; 423/122; 423/140; 423/155;
423/184; 366/118; 366/123; 366/124; 366/128;
366/600; 266/101; 310/81
[58] Field of Search ................ 422/127, 269, 281;
75/101 R, 2; 266/101; 366/118, 123, 124, 128,
600; 310/81; 423/1, 20, 27, 50, 34, 55, 65, 71,
85, 92, 101, 122, 140, 155, 184; 210/702, 703,
723, 748, 738, 737; 209/5

[56] References Cited

U.S. PATENT DOCUMENTS

| | | | |
|---|---|---|---|
| 2,360,803 | 10/1944 | Steuerman | 310/81 |
| 2,366,342 | 1/1945 | Lazan | 310/81 |
| 3,525,606 | 8/1970 | Mackenzie et al. | 422/281 |
| 4,265,129 | 5/1981 | Bodine | 75/101 R |
| 4,566,800 | 1/1986 | Bodine | 366/118 |
| 4,604,369 | 8/1986 | Shi | 423/118 |
| 4,652,535 | 3/1987 | Mackenzie et al. | 366/128 |
| 4,778,279 | 10/1988 | Bodine | 366/118 |
| 4,780,138 | 10/1988 | Mackenzie et al. | 75/101 R |

FOREIGN PATENT DOCUMENTS

| | | | |
|---|---|---|---|
| 553651 | 1/1959 | Belgium | 310/81 |
| 474822 | 10/1952 | Italy | 310/81 |
| 2152728 | 8/1985 | United Kingdom | 423/68 |

OTHER PUBLICATIONS

Thompson et al., "Effect of Ultrasonic Energy on Settling of Solids in Phosphate Tailing", Industrial and Engineering Chemistry, Jun. 1954, pp. 1172–1180.

*Primary Examiner*—Robert L. Stoll
*Assistant Examiner*—Paige C. Harvey
*Attorney, Agent, or Firm*—Edward A. Sokolski

[57] ABSTRACT

An elastic bar member is coupled to an orbiting mass oscillator and the entire assembly is suspended from a cable or the like such that the bar member has freedom of lateral motion and is nakedly immersed in a slurry having particulate material contained therein such as a mineral ore reject from which metal has been extracted. The rotor of the orbiting mass oscillator is driven at a speed such as to generate cycloidal sonic energy in the bar preferably at a frequency such as to set up resonant standing wave vibration of the bar in a cycloidal quadrature pattern. The cycloidal vibrational energy tends to set the surrounding fluid material into a whirling rotation or rotary traveling wave which facilitates the agglomeration or coagulation of the particles in the material and enhances the settling operation to make for more complete separation of the particles from the liquid.

3 Claims, 3 Drawing Sheets

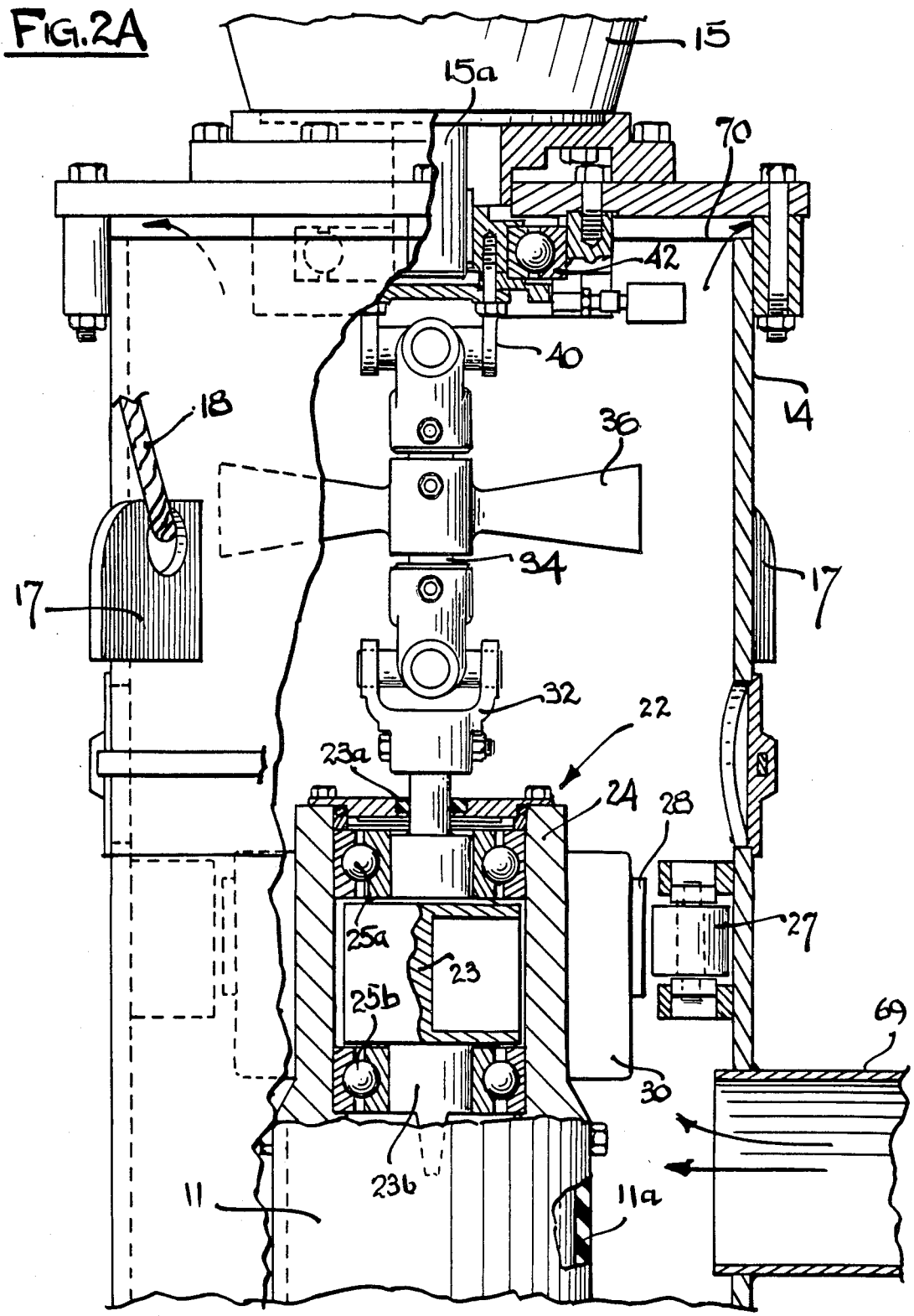

SONIC METHOD FOR FACILITATING THE REMOVAL OF SOLID PARTICLES FROM A SLURRY

This application is a continuation in part of my application Ser. No. 128,454 filed Dec. 3, 1987 now Pat. No. 4,780,138 which is a continuation of my application Ser. No. 923,575, filed Oct. 27, 1986 now abandoned.

This invention relates to the removal of solid particles from a slurry and more particularly to a sonic method for facilitating the settling of solid particles from a liquid slurry.

In connection with bulk processing of solid materials such as in hydraulic mining, ore processing, pigment and ceramic manufacturing, food processing and the like, there is typically a final disposal problem concerning large volumes of wash water or process liquid carrying a final reject suspension of very fine particular matter; this mixture sometimes called slimes. There is an economic desire to reclaim the valuably large volumes of water from these slimes. Moreover, if the solid suspension particles can in this connection be agglomerated and brought down out of the water and collected in a sort of mud it can be compacted and used in road building and the like.

Usually, these reject slimes simply look like dirty water when first comming out of the plant. One important problem is that the particulate matter is often very fine, appearing like suspended smoke. The standard procedure is to maintain literally acres of slime ponds holding this water and waiting months for the smoky slimes to gradually precipitate by gravity to the bottoms of the ponds. This is a wasteful land use and a hazard for migrating birds which get trapped by mistakenly landing in the slimy water.

This invention concerns a sonic process for projecting sonic compression waves into the slime water to cause the particles to collide and stick together to form larger blobs and thus sink faster. One theory suggests that normally the fine particles repel each other by a sort of electrostatic force; and that this phenomena becomes nullified when the particles are collided. Whatever the reason it is noted that sonic waves will coagulate or agglomerate colloidal fines, even at small percentage concentration, so that they precipitate. Coarser than colloidal matter will also settle onto the bottom faster with sonics; apparently the water is squeezed out of the mass.

The method of the present invention comprises suspending a quadrature vibrating bar in a settling tank or pond and exposing the liquid mass to a sonic wave field. For large ponds the suspended sonic bar can be dragged around through the liquid in order to extend the exposure. This can be accomplished by swinging the crane from which the bar is suspended or mounting the sonic unit on a standard turntable arm in a thickener tank. Standard flocculating chemicals can be introduced into the liquid, and the sonic action aids the contact of the flocculant with the suspended particles.

In my aforementioned application Ser. No. 128,454, apparatus for separating mineral from ore in a leachant employing energy generated by a bar member suspended in the leachant is described. The present invention employs the same apparatus as described in said prior application for carrying out the method of the present invention. The method of the present invention achieves the desired end results by clamping a radiating bar member to the housing of a sonic oscillator and suspending the assembly thus formed from above by means of a cable support or the like. The bar member thus is suspended from above in the slurry in tension by virtue of gravity so that it hangs freely therein with no need for sidewise support members. Further, the suspension of the bar member for freedom of lateral motion permits the bar member to respond to the quadrature acoustical energy with a cycloidal nutating motion (without rotation of the bar about its longitudinal axis) which tends to set the surrounding fluid material in a whirling rotation.

The sonically actuated bar is "naked" in the sense that it is free and unconfined with no interference with its radiation of complex wave energy except for its attachment at one end to the oscillator housing, and there are no frame or cage members around the bar to disrupt the complex wave energy radiating therefrom. The whirling bar with its circular orbit acts openly on the slurry held within containment means, such as a tank having a diameter much greater than that of the bar, to deliver a cyclic force thereto with a deflected force vector having a shear wave with a tangential tearing effect which greatly aids the agglomeration of solid particles suspended in the slurry. Where the mixture is in the form of a slurry in suspension in the slurry or in a colloidal mixture therein, the shear wave is particularly effective in view of the viscosity of the load, the complex wave vectors generated by the substantially exposed bar being particularly effective in agglomerating the particulate matter and separating the particles from the slurry.

It is therefore an object of this invention to improve the efficiency of slime settling apparatus by freely suspending the bar radiating the sonic energy for freedom of lateral motion in the slurry.

It is a further object of this invention to lessen the maintenance requirements in a sonic thickening system.

It is still another object of this invention to provide means for minimizing the compressional forces on a sonic bar used in thickening so as to permit optimal radiation of sidewise cycloidal energy therefrom.

Other objects of the invention will become apparent as the description proceeds in connection of the accompanying drawings of which:

BRIEF DESCRIPTION OF THE DRAWINGS

FIGS. 2A and 2B are side elevational views with partial cutaway sections illustrating the structural details of the preferred embodiment.

Figure 1:
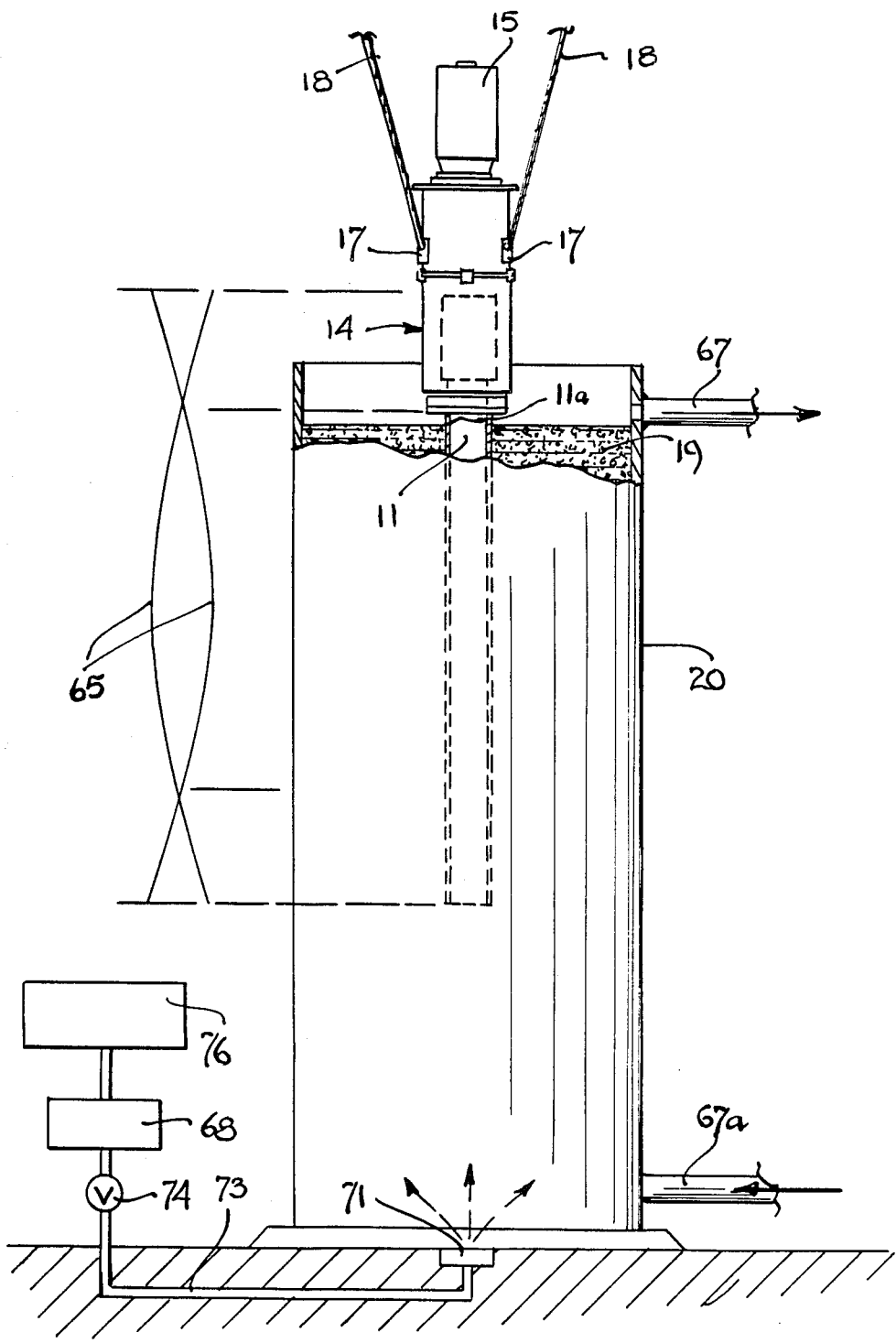
FIG. 1 is a side elevational view of a preferred embodiment of the invention.

Briefly described the system of the invention comprises a bar member fabricated of an elastic material such as steel which is clamped to the housing of an oscillator designed to generate cycloidal vibrational energy at a sonic frequency. This oscillator may be of the orbiting mass type or may employ other types of excitation such as provided by another type of mechanical vibratory drive or by a magnetic, magneto-strictive or hydraulic vibratory drive. The bar member is supported for freedom of lateral motion in a slurry containing particulate material which is to be settled so as to be separated from the liquid. The bar member may be suspended in the slurry by means of a cable or the like which may be attached to the housing assembly in which the orbiting mass oscillator is contained. The oscillator is preferably driven at a speed such as to effect a resonant standing wave cycloidal vibration of the bar member at a sonic frequency, this sonic energy aiding the separation of the particulate material from the slurry.

In order to facilitate the comprehension of the operation of the device of the invention, it is helpful to make an analogy between an electrical resonant circuit and a mechanical resonant circuit. This type of an analogy is well known to those skilled in the art, and is described for example, in chapter 2 of "Sonics" by *Hueter and Bolt* published in 1955 by John Wiley & Sons. In making such an analogy, force F is equated with electrical voltage E, velocity of vibration u is equated with electrical current i, mechanical compliance $C_m$ is equated with electrical capacitance $C_e$, mass M is equated with electrical inductance L, mechanical resistance (such as friction) $R_m$ is equated with electrical resistance R. Mechanical impedance $Z_m$ is equated with electrical impedance $Z_e$. Thus, it can be shown that if a member is elastically vibrated by a sinusoidal force Fhd o sin $\omega t$, being equal to $2\pi$ times the frequency of vibration, $$Z_m = R_m + j\left(\omega M - \frac{1}{\omega C_m}\right) = \frac{F_o \sin\omega t}{u} \quad (1)$$

Where $\omega M$ is equal to $1/\omega C_m$ a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration U is at a maximum, effective power factor is unity, and energy is most efficiently delivered to the object being vibrated. It is such a high efficiency resonant condition in the elastic system being driven that is preferably utilized in the method and device of this invention to achieve the desired end results.

It is to be noted by reference to Equation 1 that velocity of vibration u is highest where impedance $Z_m$ is lowest, and vice versa. Therefore, a high-impedance load will tend to vibrate at relatively low velocity, and vice versa. Thus, at an interface between high and low impedance elements, a high relative movement results by virtue of such impedance mismatch which, as in the equivalent electrical circuit, results in a high reflected wave. Such an impedance mismatch condition between a resonator bar, the wall of the tank and the material in the slurry can be utilized to free the particulate from the suspension effects.

Just as the sharpness of resonance of an electrical circuit is defined as the "Q" thereof, and is indicative of the ratio of energy store to the energy used in each cycle, so also the "Q" of the mechanical resonant circuit has the same significance and is equal to the ratio between $\omega M$ and $R_m$. Thus, high efficiency and considerable cyclic motion can be achieved by designing the mechanical resonant circuit for high "Q".

Of particular significance is the implementation of the method and device of this invention, is the high acceleration of the components of the elastic resonant system that can be achieved at sonic frequencies. The acceleration of a vibrating mass is a function of the square of the frequency of the drive signal times the amplitude of vibration. This can be shown as follows:

The instantaneous displacement y of a sinusoidally vibrating mass can be represented by the following equation:

$$y = Y \cos \omega t \quad (2)$$

where Y is the maximum displacement in the vibration cycle and a is equal to $2\pi f$, f being the frequency of vibration.

The acceleration of "a" of the mass can be obtained by differentiating Equation 2 twice, as follows:

$$a = \frac{d^2y}{dt^2} = Y\omega^2 \cos(\omega t) \quad (3)$$

The acceleration "a" thus is a function of Y times $(2\pi f)^2$. At resonance, Y is at a maximum and thus even at moderately high sonic frequencies, very high accelerations are achieved.

In considering Equation 1, several factors should be kept in mind. Firstly, this equation represents the total effective resistance, mass, and compliance in a mechanical circuit, and these parameters are generally distributed throughout the system rather than being lumped in any one component or portion thereof. Secondly, the vibrating system often includes not only the resonator but the slurry. Thirdly, an orbiting mass oscillator is utilized with the device of the invention that automatically adjusts its output frequency to maintain resonance with changes in the characteristics of the load. Thus, in situations where we are dealing with a fluid material which can contain varying amount of solid raw material and thereby change its characteristics, the system automatically is maintained at optimum resonant operation by virtue of the "lock-in" characteristics of applicant's unique orbiting-mass oscillators. With these basic considerations in mind, let us now turn to the specific embodiments of the device of the invention.

Referring now to FIG. 1, a preferred embodiment of the invention is illustrated. Bar member 11 is clamped to the casing of an orbiting mass oscillator contained within housing 14 by means to be described further on in the specification. Mounted on housing 14 is a hydraulic motor 15 which rotatably drives the rotor of the oscillator contained within the housing. Housing 14 has hooks 17 welded thereto to which cables 18 or chains are attached, the cables being connected to a suitable lift (not shown) from which the entire assembly is supported with the bar member immersed in the slurry 19 contained within containment means formed by tank 20. Also contained in the slurry within tank 20 is a particulate material such as a mineral from which ore has been extracted or leached into solution. Bar member 11 has an elastomeric coating 11a thereon to protect it from the chemical environment of the solution. The rotor of the oscillator is driven by motor 15 at a speed such as to set up resonant elastic vibration of bar member 11 in a cycloidal vibrational mode as indicated by graph lines 65.

Air or commercial flocculating chemicals may be introduced into the leaching solution at a controlled rate to optimize cavitation and agglomeration in the liquid which enhances the desired thickening.

An air compressor 76 has a pressure regulator 68 and an air flow control 74 installed in its output line 73. Line 73 is connected to an inlet 71 in the bottom of tank 20. Thus, air in a regulated controlled flow is introduced into the solution 19 contained in the tank in the sonic field of the energy radiated by bar 11 so that the air is dispersed into minute bubbles as it rises by gravity or liquid pressure around and past the sonic bar 11. It is to be noted that the air should preferably be introduced so that it follows the liquid flow past the bar. Thus, in situations where the liquid flow is downward rather than upward, it is preferable to introduce the air at an upper portion of the tank so it is swept downwardly past the bar.

It is significant to note that in some situations only a few minutes or even less than a minute is required to obtain the desired agglomerating action. Also, in some situations, the air entrained in the liquid in view of its exposure to the ambient atmosphere can suffice to achieve the desired end results. However, in most situations, strong cavitation in the liquid will evacuate a substantial amount of the air from the liquid, so that unless settling is achieved in a relatively short time (usually less than a half hour), the controlled addition of air as indicated above is required.

Figure 2B:
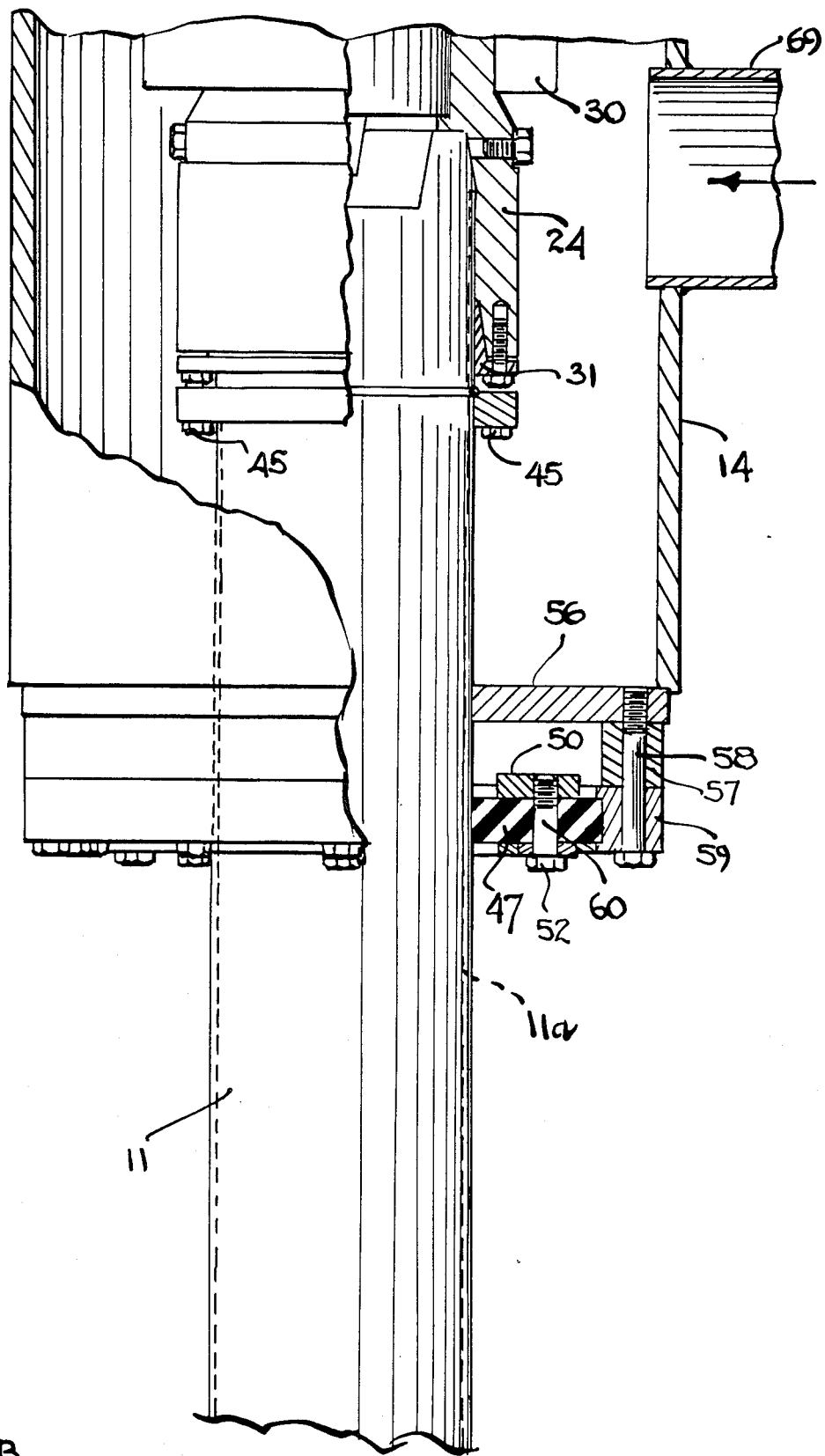

Referring now to FIGS. 2A and 2B, the structural details of the preferred embodiment are illustrated. Orbiting mass oscillator 22 has an eccentric rotor 23, the shafts 23a and 23b of the rotor being mounted for rotation in housing 24 on roller or ball bearing assemblies 25a and 25b, respectively. Rubber roller bumpers 27 are rotatably mounted on the inner wall of housing 14 and operate in conjunction with a rubber annular bumper 28 mounted on annular member 30 which is attached to the oscillator housing, to stabilize and align the oscillator housing 24 within the main housing 14.

Oscillator shaft portion 23a is coupled by means of U-joint 32 to shaft 34 which also provides a drive shaft for cooling fan 36. The upper end of shaft 34 is in turn coupled through U-joint 40 to the drive shaft 15a of motor 15. Shaft 15a and U-joint 40 are supported for rotation on roller bearing assembly 42 which is mounted on housing 14.

Referring now to FIG. 2B, oscillator housing 24 is clamped to bar member 11 by means of wedge clamping ring 31 which is retained in clamping engagement against the bar by means of bolts 45. Ring member 59 is spaced from end plate 56 by means of spacer 57 and supported on the end plate which is welded to the end of housing 14, suh support being achieved by means of bolts 58 which threadably engage end plate 56. Sandwiched between circular plates 50 and 52 is a rubber bushing 47, this bushing being compressed between the plates by means of bolts 60 and thus compressively retained between ring 59 and bar 11. Bushing 47 is thus made to grip the outer wall of bar 11 thereby centering the bar in position within housing 14. The cooling fan 36 induces air into port 69, past fins 30 and through vent 70. The weight of bar 11 is carried in tension by virtue of gravity on the bearing assembly 25a-25b which in turn is supported through the linkage provided by U-joints 32 and 40, shaft 34 and roller bearing 42.

Oscillator rotor 23 is rotatably driven by motor 15 at a speed such as to set up resonant cycloidal vibration in bar 11 as indicated by the graph lines 65 in FIG. 1. As can be seen, a node of the standing wave vibrational pattern appears in the region where the bar is being gripped to the housing by rubber bushing 47. Bar member 11 is free to operate in the nature of a stirring rod in response to the cycloidal vibrational energy, being freely suspended in tension by virtue of gravity within the leaching solution 19. The bar member may be dragged through the slurry to thoroughly impart the sonic action to all portions thereof. The slurry solution containing sonically agglomerated fines may be pumped out from tank 20 through outlet 67 by suitable pumping action after being introduced through inlet 67a.

While the invention has been described and illustrated in detail, it is to be clearly understood that this is intended by way of illustration and example only and is not to be taken by way of limitation, the spirit and scope of the invention being limited only by the terms of the following claims.

I claim:

1. A method for facilitating the settling of solid particles from a liquid slurry comprising the steps of:
    attaching an oscillator to one end of a bar member of an elastic material,
    supporting said bar member suspended in tension in said liquid slurry without any sidewise support for freedom of lateral motion throughout substantially the entire extent of said bar member; and
    driving said oscillator so as to cause cycloidal resonant standing wave vibration of said bar member to effect quadrature motion of said bar member throughout the longitudinal extent thereof,
    whereby sonic energy is transferred from said bar member to the slurry to set up force vectors therein both normal and tangential to said bar member thereby facilitating the agglomeration of the solid particles and engendering the settling of the particles from the slurry.

2. The method of claim 1 and further including the step of moving the bar through the slurry.

3. The method of claim 2 and further including adding a flocculating agent to said slurry.

* * * * *